United States Patent
Herzen et al.

(10) Patent No.: US 10,321,488 B2
(45) Date of Patent: Jun. 11, 2019

(54) CSMA/CA IN TIME AND FREQUENCY DOMAINS

(71) Applicant: ECOLE POLYTECHNIQUE FEDERALE DE LAUSANNE (EPFL), Lausanne (CH)

(72) Inventors: Julien Herzen, Lausanne (CH); Patrick Thiran, St-Sulpice (CH); Albert Banchs, Leganés (ES); Vsevolod Shneer, Edinburgh (GB)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 13 days.

(21) Appl. No.: 15/604,486

(22) Filed: May 24, 2017

(65) Prior Publication Data
US 2017/0347377 A1 Nov. 30, 2017

Related U.S. Application Data

(60) Provisional application No. 62/342,584, filed on May 27, 2016.

(51) Int. Cl.
*H04W 74/08* (2009.01)
(52) U.S. Cl.
CPC ............... *H04W 74/0825* (2013.01)
(58) Field of Classification Search
CPC .............................................. H04W 74/0825
See application file for complete search history.

(56) References Cited

U.S. PATENT DOCUMENTS

| 7,864,674 | B2* | 1/2011 | Benveniste | H04L 47/10 370/230 |
| 2007/0054645 | A1* | 3/2007 | Pan | H04W 24/08 455/266 |
| 2008/0219176 | A1* | 9/2008 | Yamada | H04L 47/10 370/252 |

(Continued)

OTHER PUBLICATIONS

Shravan Rayanchu, Fluid: Improving Throughputs in Enterprise Wireless LANs through Flexible Channelization, Article.

(Continued)

*Primary Examiner* — Duc C Ho
(74) *Attorney, Agent, or Firm* — Mu P.C

(57) ABSTRACT

The present invention concerns a method for a communication device to transmit a data packet in a wireless communication system. The method comprises: determining a first set of transmission parameters comprising a first central transmission frequency and a first spectral bandwidth; transmitting a first data packet by applying the first set of transmission parameters; determining whether or not the first data packet collided with a second data packet from a second communication device; determining a second set of transmission parameters, which in case of collision comprises a second central transmission frequency, different from the first central transmission frequency, and a second spectral bandwidth, which is different from the first spectral bandwidth with a first, non-zero probability and the same as the first spectral bandwidth with a second probability; and transmitting a second data packet by applying the second set of transmission parameters.

19 Claims, 3 Drawing Sheets

(56) References Cited

U.S. PATENT DOCUMENTS

2009/0190558 A1* 7/2009 Strutt .................. H04L 1/0019
370/332

OTHER PUBLICATIONS

Kun Tan, Fine-grained Channel Access in Wireless LAN, Article.
Krishna Chintalapudi, Fine-grained Channel Access in Wireless LAN, Article.
Eugene Chai, Building Efficient Spectrum-Agile Devices for Dummies, Article.
Sangki Yun, Fine-grained Spectrum Adaptation in WiFi Networks, Article.
Thomas Moscibroda, Load-Aware Spectrum Distribution in Wireless LANs, Article.
Seyed K. Fayaz, Ez-Channel: A distributed MAC protocol for efficient channelization in wireless networks, Article.
Matthew Gast, 802.11ac: A Survival Guide, Book.
Bruno Kauftmann, Measurement-Based Self Organization of Interfering 802.11 Wireless Access Networks, Article.
Julien Herzen, Distributed Spectrum Assignment for Home WLANs, Article.
Gilles Berger-Sabbatel, Fairness and Its Impact on Delay in 802.11 Networks, Article.
Rodolfo Oliveira, Performance Analysis of the IEEE 802.11 Distributed Coordination Function With Unicast and Broadcast Traffic, Article.
Petra Berenbrink, Balls-into-Bins with Nearly Optimal Load Distribution, Article.
Mathilde Durvy, Self-Organization Properties of CSMA/CA Systems and Their Consequences on Fairness, Article.
Ranveer Chandra, A Case for Adapting Channel Width in Wireless Networks, Article.
Minyu Fang, Decentralised Learning MACs for Collision-free Access in WLANs, Article.
Paul Patras, A Control Theoretic Approach to Distributed Optimal Configuration of 802.11 WLANs, Article.
Ritesh Maheshwari, Adaptive Channelization for High Data Rate Wireless Networks, Article.
Hojoong Kwon, Generalized CSMA/CA for OFDMA Systems: Protocol Design, Throughput Analysis, and Implementation Issues, Article.
Souvik Sen, No Time to Countdown: Migrating Backoff to the Frequency Domain, Article.
Eugenio Magistretti, WiFi-Nano : Reclaiming WiFi Efficiency through 800 ns slots, Article.
Xiaojun Feng, Use Your Frequency Wisely: Explore Frequency Domain for Channel Contention and ACK, Article.
Julien Herzen, CSMA/CA in Time and Frequency Domains, Article, published Oct. 13, 2015.

* cited by examiner

CSMA/CA IN TIME AND FREQUENCY DOMAINS

TECHNICAL FIELD

The present invention relates to a method of scheduling wireless data transmissions in time and frequency domains in a wireless communication system. The invention also relates to a communication device for carrying out the method, and to a wireless communication system.

BACKGROUND OF THE INVENTION

It has been shown that flexible channelization, whereby wireless stations adapt their spectrum bands on a per-frame basis, is feasible in practice. It is known that flexible channelization has the potential to drastically increase the efficiency, fairness and load-balancing properties of wireless networks. In particular, it provides the following advantages. First, adding frequency domain decisions to the contention resolution process can mitigate severe time-domain overheads of many communication standards, such as 802.11, which are exacerbated by recent physical (PHY) layers. Second, adapting the amount of consumed spectrum becomes crucial to avoid interference in communication systems, for example in recent 802.11 amendments such as 802.11ac, which can use large channel bandwidths (up to 160 MHz) and currently requires very careful spectrum planning. Third, modulating spectrum on a per-frame basis departs from the usual static channel assignment perspective, and enables spectrum-allocation schemes to finely adapt to instantaneous traffic loads.

Despite important promises in terms of performance improvements, finding efficient schedules in time and frequency domains is difficult. It requires that different stations of a communication system reach some level of coordination, because for each frame they need to choose "time-spectrum blocks" which (i) do not overlap (to avoid interference) and (ii) consume as much of the available spectrum as possible (to maximize performance). For this reason, currently known schemes for flexible channelization rely on different forms of explicit signaling, synchronization, spectrum scanning or central control, in order to coordinate neighboring stations and efficiently organize transmissions. Employing such extra signaling introduces extra overhead and complexity, and typically adapts poorly to variable traffic.

For example, to arbitrate transmissions and avoid collisions, 802.11 specifies a distributed coordination function (DCF) based on carrier sense multiple access with collision avoidance (CSMA/CA). When a station receives a new packet for transmission from the upper layer, it selects a backoff counter (BC) uniformly at random from $\{0, \ldots, CW-1\}$, where CW denotes the contention window and is initially set to a minimum value $CW_{min}$. The backoff mechanism employs a discrete time scale; for each time slot during which the medium is sensed to be idle (i.e. below the carrier-sensing threshold), the station decreases its backoff counter BC by 1. It is to be noted that in the present description, the term mechanism is being used in its metaphorical sense, meaning a means or technique. When the medium is sensed busy, the station freezes its backoff counter until the medium is sensed idle again for a duration equal to DCF interframe space (DIFS). The station transmits when the backoff counter reaches 0. If the destination station successfully receives the frame, it waits for a duration equal to short interframe space (SIFS) and replies with an acknowledgement (ACK). If there is a collision (detected by a missing ACK), this is interpreted as contention, and the transmitting station reduces its aggressiveness by doubling CW (up to a $CW_{max}$ value). It then repeats the process.

The time slot duration must last long enough to perform reliable carrier-sensing (i.e. measure the energy level), switch the radio frequency (RF) front-end from receiving to transmitting, and account for possible propagation delays. It appears that these durations are mostly incompressible; for instance the 802.11a/g/n/ac amendments have been using time slot durations given by $t_{slot}=9$ µs for more than a decade. Similarly, SIFS needs to account for the time required to process the incoming frame and to switch the mode of the RF front-end to transmit the ACK. 802.11a/n/ac use SIFS durations given by $t_{SIFS}=16$ µs. These time constraints also propagate to DIFS, which is set to SIFS+2 time slots and is equal to $t_{DIFS}=34$ µs for 802.11a/n/ac. Finally, each frame starts with the transmission of a PHY preamble, which is required to detect and to decode frame transmissions, as well as to set the spectrum and modulation parameters. In total, 802.11ac uses PHY preambles lasting for durations of $t_{PHY}=44$ µs.

A normalized throughput or efficiency of a media access control (MAC) protocol can be defined as the product of (i) the fraction of time and (ii) the fraction of spectrum that are used for successful transmission of payload traffic. Since 802.11, for example, uses 100% of its channel, its efficiency is only determined by its time-domain operation. To analyze the efficiency of 802.11 as a function of the PHY rate, a following simple analytical model can be used. When there is only one transmitting station (and thus no collision), the average value of BC, which is denoted by $\overline{BC}$, is given by $\overline{BC}=(CW_{min}-1)/2$. The efficiency can thus be easily computed as $$\mathit{eff}_{802.11}=t_{data}/(t_{DIFS}+\overline{BC}t_{slot}+t_{PHY}+t_{data}+t_{SIFS}+t_{ACK}),$$

where $t_{data}$ denotes the time required to transmit the payload and $t_{ACK}$ is the total time required to send the ACK. Although faster transmission rates reduce the total time required for transmitting a frame, they exacerbate the time-domain overheads explained above, because proportionally, the time domain overheads now take longer than with slower transmission rates. The efficiency is often below 10% with 802.11ac, for example.

It is an object of the present invention to overcome the problems related to the efficient use of network resources in wireless communication systems.

SUMMARY OF THE INVENTION

According to a first aspect of the invention, there is provided a method for a communication device to transmit a data packet in a wireless communication system as recited in claim 1.

The proposed solution has the advantage that the method is simple, because it does not require any signaling or synchronized transmissions. Relying on synchronized transmissions can introduce additional inefficiencies (e.g. if the traffic is such that the payloads do not have the same durations). The proposed method also does not rely on a central controller to take the scheduling decisions. In contrast to existing solutions, the present method modulates its aggressiveness and decides on the schedules in time and frequency domains in a purely random-access fashion, using only collisions, successes and carrier sensing as implicit signals.

According to a second aspect of the invention, there is provided a communication device for transmitting a data packet in a wireless communication system as recited in claim 18.

According to a third aspect of the invention, there is provided a wireless communication system comprising the communication device.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
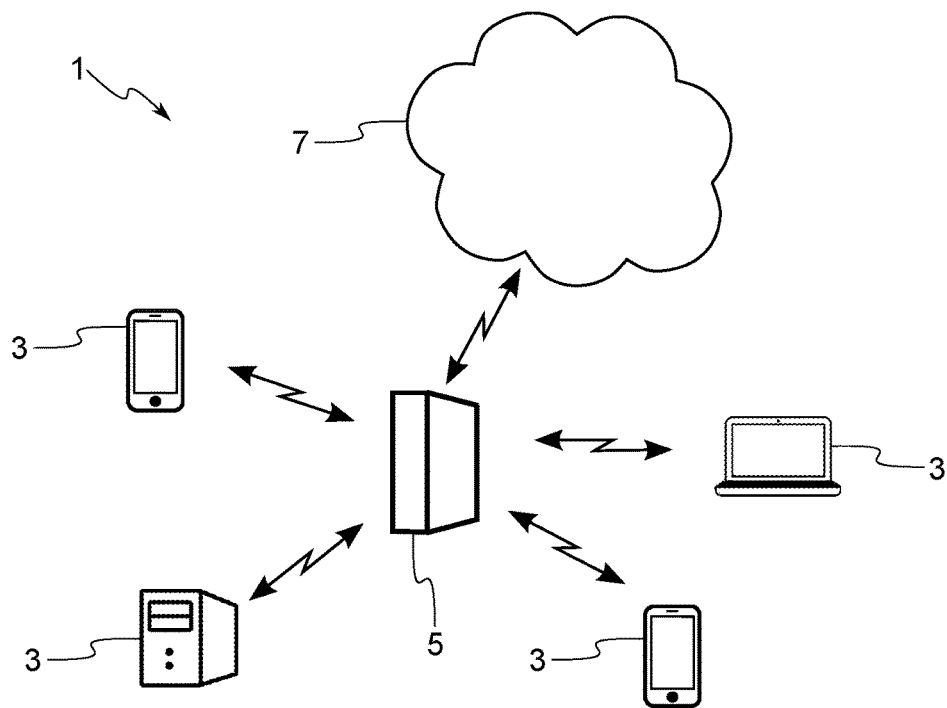
FIG. 1 illustrates schematically and in a simplified manner an example communication network where the teachings of the present invention may be applied.

An embodiment of the present invention will now be described in detail with reference to the attached figures. This embodiment is described in the context of a wireless local area network, but the teachings of the invention are not limited to this environment. The teachings of the invention are also applicable to other wireless communication networks. Identical or corresponding functional and structural elements which appear in the different drawings are assigned the same reference numerals.

The present invention provides a new approach for scheduling packets, sometimes also referred to as data packages or units of data, in time and frequency domains. The proposed technique is completely decentralized and requires no synchronization, explicit signaling, control traffic, or spectrum scans. In the present description, the proposed multiple access method is referred to as a TF-CSMA/CA, i.e. CSMA/CA in time and frequency domains. Furthermore, in the present description, according to an example embodiment, the proposed TF-CSMA/CA technique is explained as an extension to the 802.11 standard. However, the teachings of the present invention are by no means limited to 802.11. The teachings of the invention are equally applicable to other communication standards as well.

Thus, in the described embodiment, the proposed TF-CSMA/CA technique can be considered to be an extension of the time-domain CSMA/CA backoff mechanism of 802.11 to the frequency domain. In addition to the well-known contention window and backoff counter used in the time domain, TF-CSMA/CA also dynamically adjusts the channel bandwidth and center frequency used for each frame, also referred to as a data packet, which determine the spectral-domain behavior. When a station, also referred to as communication device or node, is involved in a collision, it hops to another spectrum band and (with a certain probability) decreases both its time-domain aggressiveness and its (average) spectrum consumption as explained later in more detail. In contrast, when a station experiences a successful transmission, it remains in its current spectrum band with a large probability, and it increases its (average) spectrum consumption with a small probability.

In the described embodiment, TF-CSMA/CA respects the design and engineering principles of 802.11: it is purely a random-access mechanism that adapts its time-spectrum aggressiveness based only on transmission outcomes (collisions or successes) and/or carrier sensing. Although the proposed additional decision rules are relatively simple to describe, it will be understood that they produce non-trivial self-organizing behaviors, whereby stations avoid interference while efficiently using the available spectrum in both time and frequency domains.

Compared to time-domain random access, TF-CSMA/CA provides several important advantages. First, it drastically reduces the inefficiencies caused by the recent physical layers of 802.11n and 802.11ac. These amendments to 802.11 deliver up to multi-gigabit raw transmission rates, by using techniques such as multi-user multiple-input and multiple-output (MU-MIMO), aggressive modulations, and larger channel bandwidths (up to 40 MHz for 802.11n and up to 160 MHz for 802.11ac). Although these techniques drastically reduce the time required to transmit a frame, they also increase correspondingly the time-domain overheads due to backoff, acknowledgments, physical layer preambles, and other MAC layer overheads. To mitigate this, 802.11n and 802.11ac amendments have the ability to use frame-aggregation mechanisms in order to increase the transmission durations. The sizes of the aggregated frames can reach up to 65 kB for 802.11n and up to 4.5 MB for 802.11ac. Although heavy aggregation increases efficiency, it does not help applications producing chatty traffic, or real-time traffic such as video, voice over internet protocol (VoIP) or gaming, which cannot afford to wait for large buffers to fill up. In contrast, TF-CSMA/CA drastically reduces these inefficiencies, by (i) reducing the channel width in case of interference (thus reducing the fraction of time consumed by overheads, as reducing the bandwidth increases the transmission duration while maintaining the same overheads) and (ii) being much more aggressive in the time domain (it is able to use minimum contention windows as low as $CW_{min}=2$ while maintaining excellent fairness, compared to $CW_{min}=16$ with current 802.11).

In addition to improving efficiency, TF-CSMA/CA also serves to dynamically find non-overlapping channels in interfering networks. Indeed, the use of larger channel widths makes it increasingly difficult to assign non-overlapping channels to neighboring networks (in the US, there is currently only one contiguous 160 MHz band available in the 5.17-5.33 GHz range). 802.11ac can use different channel widths of 20, 40, 80 and 160 MHz and can decide to use channel bonding on a per-frame basis. However, this decision amounts only to deciding whether or not to employ the non-primary channel, and it offers only limited additional flexibility because the primary channel remains fixed. In fact, 802.11ac requires very careful spectrum planning in order to manage interference when large channel widths are employed. TF-CSMA/CA finds interference-free schedules and spectrum allocations directly at the MAC layer, as determined by instantaneous traffic loads.

In summary, the present invention provides a new mechanism for scheduling packets in time and frequency domains without requiring any form of control traffic. Notably, it will be explained that even without synchronization, the stations can self-organize to find variable width spectrum bands that avoid interference while efficiently using the available spectrum.

FIG. 1 shows a simplified example network architecture of a wireless communication system or network 1 where the teachings of the preset invention may be applied. Stations 3 are shown which can communicate with a wireless access point 5. In this example the wireless access point 5 in turn is connected to a wireless distribution system 7, which may be connected to the internet. The stations 3 may be various types of wireless communication devices or apparatuses such as mobile phones, laptops, desktop computers or other devices arranged to communicate wirelessly with other communication devices. In this example the stations 3 compete for the same wireless transmission medium to be able to communicate wirelessly with the wireless access point 5. The teachings of the invention may be implemented for example by any one of the stations 1 or the wireless access point 5 in FIG. 1.

Compared to 802.11 using legacy time domain random access procedure, TF-CSMA/CA improves the efficiency by the following two techniques.

1) Reducing Backoff Durations:

Current 802.11 amendments use $CW_{min}=16$. One obvious solution for improving efficiency is to reduce the overhead due to the backoff process, by employing smaller contention windows (i.e. smaller $CW_{min}$ values). Of course, with the default time domain mechanism of 802.11, there are good reasons for employing a reasonably large $CW_{min}$. If the stations transmit too aggressively (small $CW_{min}$), they can increase the collision probability (thereby reducing the overall efficiency) and even cause starvation. Too small values for $CW_{min}$, can cause poor short-term fairness (i.e. fairness evaluated on short time horizons), as some stations might starve for long durations before successfully sending a packet. By separating transmissions in the frequency domain as well, TF-CSMA/CA can employ drastically lower contention windows (such as $CW_{min}=2$). As a result, the stations waste much less time waiting to transmit, which increases the overall efficiency without causing starvation.

2) Using Narrow Channels for Multiple Stations:

Even with dangerously small $CW_{min}$, and backoff durations, current 802.11 solutions still obtain relatively low efficiencies (about 10% or even less). A solution to further improve efficiency is to reduce channel bandwidths; narrow channels require longer durations to send a given number of payload symbols, and thus amortize the time-domain overheads. Note, however, that for a single station, simply dividing a wide-band channel into several narrow-band channels to send several longer frames effectively requires buffering more payload bits and is thus equivalent to performing aggregation on the original wide-band channel. However, when multiple stations compete for access, it is possible to increase efficiency by having each station transmit in parallel on different narrow bands (without requiring more payload to be buffered).

In the remainder of the description, it will be shown that it is possible to implement the two above-mentioned solutions (reduction of backoff durations and narrow channels for multiple stations), by extending the contention resolution process of 802.11 to the frequency domain. Backing off in the frequency domain enables TF-CSMA/CA to use very small $CW_{min}$, values and reach efficiencies much higher than 802.11 (or any other time domain scheduling mechanism), while maintaining excellent fairness and removing the starvation problem existing for 802.11 with small $CW_{min}$, values. Overall, when N=1 (N is the number of stations), the efficiency gain comes only from a reduction in backoff duration. When N>1, the gain comes from a combination of reduced backoff durations and reduced overheads over narrower bandwidths. Notably, it will be shown that when N>1, the stations naturally converge to operating points where they use an average amount of spectrum proportional to 1/N—without knowing the number of stations N.

The proposed TF-CSMA/CA technique is next explained in more detail. First, some notations are introduced, and then the algorithm itself.

System Model and Notations

It is assumed that the stations use a flexible baseband design, which lets the receivers (e.g. the stations 3 in FIG. 1) to detect the center frequency and bandwidth used by incoming transmissions (e.g. using PHY-layer preambles) and process frames accordingly. The description focuses on the case where the stations 3 use contiguous chunks of spectrum (i.e. without fragmentation), which is simpler in terms of system design. Hence, with TF-CSMA/CA, in addition to its contention window CW and backoff counter BC, each station 3 also maintains its current center frequency CF and bandwidth BW. These parameters are the spectrum parameters used at any point in time for packet transmissions and carrier sensing. To describe spectrum constraints, $CF_{BW}$ denotes the set of center frequencies which can be used with a given bandwidth BW (for example, in the 5.17-5.33 GHz band, $CF_{160\ MHz}=\{5.25\ GHz\}$ and $CF_{80\ MHz}=\{5.21\ GHz, 5.29\ GHz\}$, etc.). $BW_{min}$ and $BW_{max}$ denote the minimum and maximum available bandwidths allowed in the communication system, respectively (e.g. in 802.11ac settings, $BW_{min}$ may be 20 MHz and $BW_{min}$ may be 160 MHz). For simplicity of exposition, it is assumed throughout the description that bandwidths are powers of 2, so that switching to the next larger (or next smaller) bandwidth is obtained by multiplying (or dividing) the current bandwidth by 2 (in a similar way as CW for 802.11). Finally, TF-CSMA/CA employs a value of $CW_{min}$ which depends on the current bandwidth BW, and which is denoted by $CW_{min}^{BW}$.

Description of TF-CSMA/CA

TF-CSMA/CA is based on the following two observations:

Reaction to collisions in the frequency domain: In the presence of contention, the stations should preferably separate their transmissions in the frequency domain. This is because orthogonal transmissions in the frequency domain enable simultaneous transmission of packets, and narrow bands reduce the time-domain overheads mentioned earlier. Therefore, upon experiencing a collision, a station should seek another spectrum band by changing its center transmission frequency. In addition, frequent collisions should be interpreted as a signal that the station 3 is using too much spectrum and should thus reduce its channel bandwidth to be able to find a free spectrum band.

Reaction to successes in the frequency domain: Repeated successes indicate that a station operates alone in its spectrum band. The station should thus remain in this band or, with a small probability, try to increase its bandwidth in order to determine whether or not it is possible to use more spectrum.

Figure 2:
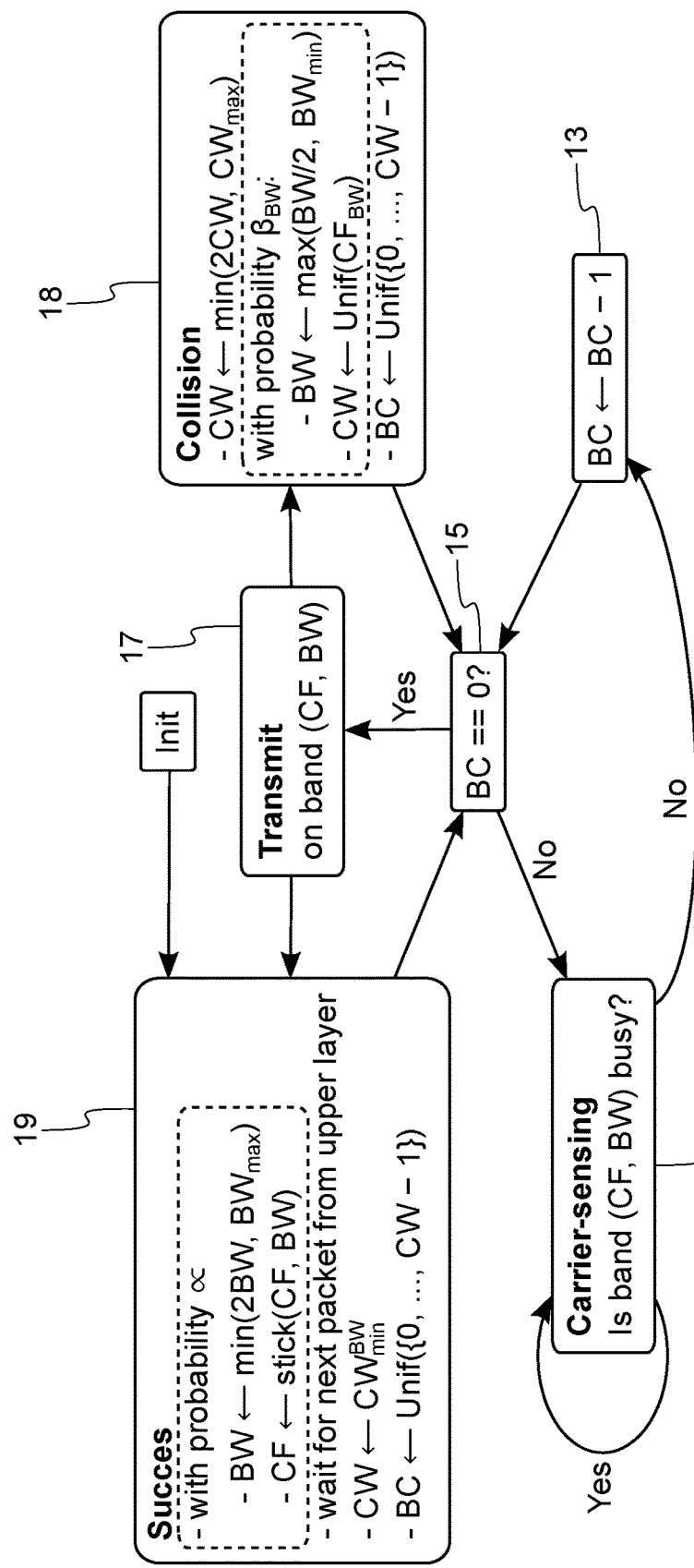
FIG. 2 illustrates a finite state machine of the proposed method according to one example and running in one communication device.

FIG. 2 illustrates the operation of TF-CSMA/CA at a single station 3 as a finite-state machine. The stations 3 start in any arbitrary combination of center frequency and bandwidth. In this example, the time-domain backoff mechanism is equivalent to that of 802.11. Upon receiving a data packet from the upper layer, the station 3 draws BC uniformly at random from $\{0, \ldots, CW_{min}^{BW}-1\}$. It then performs carrier-sensing on the current band in step 11, which is specified by the tuple (CF, BW). In step 13, for each time slot during which the band is sensed idle, the station decreases BC by 1 (in this example the time slots have the same duration as in 802.11). If in step 15 it is determined that BC has reached 0, the station 3 attempts a transmission in step 17. If the destination station successfully receives the frame, it sends an ACK on the same band (CF, BW) (after a SIFS duration). If the transmission collides (as detected by a missing ACK), in step 18 the station 3 increases CW, in this example doubles it and selects the BC uniformly at random as explained above. If the transmission succeeds, in step 19 the station sets CW to $CW_{min}^{BW}$, and selects the BC uniformly at random as explained above.

The new features of the present invention compared to 802.11 are indicated in the boxes shown with dashed outlines. These features comprise the following additional actions. If a collision occurs, in step 18 the station 3 re-selects a new center frequency CF uniformly at random, although other ways of selecting the new center frequency are also possible. In a further variant, the center frequency is not changed. In addition, it reduces BW, in this example it divides BW by 2 with a probability $\beta_{BW}$, which depends on the current bandwidth. In contrast, in the event of a successful transmission, in step 19 the station 3 increases BW, in this example doubles it with a probability $\alpha$. Finally, if BW changes because of a successful transmission, the station 3 also re-selects a new CF, which is as close as possible to its current CF. This action is represented by the "stick" function in FIG. 2: the function stick (CF, BW) simply returns the center frequency $CF_{BW}$ which is the closest to the current CF (breaking ties uniformly at random).

Note that the parameters BW and CF play roles in the frequency domain that are similar to CW and BC in the time domain. BW determines aggressiveness in the frequency domain, similarly to CW in the time domain. Likewise, CF and BC determine the localizations of the resource chunks consumed in the frequency and time domains, respectively.

Time-Domain Behavior and Configuration of $CW_{min}$

As will be shown later, the stations 3 running TF-CSMA/CA converge to using non-overlapping spectrum bands that are well spread over the entire available spectrum. Although TF-CSMA/CA uses a time-domain mechanism similar to 802.11, the fact that it can self-organize in the spectral domain makes it possible to configure the time-domain backoff mechanism in a more efficient way.

When the stations 3 use large bandwidths, TF-CSMA/CA attempts to separate their transmissions in the frequency domain, by reducing their bandwidth and letting them transmit on orthogonal sub-bands. As a result, contention can be resolved entirely in the frequency domain and the stations 3 operating with large bandwidths can be much more aggressive in the time domain (i.e. employ very short backoff durations) without risking starving other stations. In contrast, when the stations already use narrow bandwidths (for example, if there are many stations using orthogonal bands with the minimum bandwidth $BW_{min}$), some stations may have to share some spectrum bands. Therefore, in this case, the stations should also use the time domain to separate their transmissions (i.e. employ reasonably long backoff durations—note, however, that the time spent in backoff represents a smaller overhead when using small bandwidths).

Overall, the importance of the time domain in the contention-resolution process should thus depend on the bandwidth. In particular, $CW_{min}^{BW}$ should be a decreasing sequence of BW. In this description, however, it is proposed to use $CW_{min}$ values given by $$CW_{min}^{BW} = \left\lceil \frac{16}{BW/BW_{min}} \right\rceil.$$

This sequence is such that $CW_{min}^{BW_{min}}=16$, which corresponds to the current default $CW_{min}$ employed by 802.11. In 802.11ac settings, the corresponding sequence is $CW_{min}^{20\ MHz}=16$, $CW_{min}^{40\ MHz}=8$, $CW_{min}^{80\ MHz}=4$ and $CW_{min}^{160\ MHz}=2$. Of course other values for $CW_{min}^{BW}$ would also be possible, for example values which are not powers of 2.

Mechanism for Adapting Contention Bandwidth

TF-CSMA/CA, as described above, uses spectrum efficiently, but it can create problematic situations in terms of short-term fairness. When several stations 3 transmit simultaneously on orthogonal narrow bands, it is possible that a given wide band, which contains some of these narrow bands, rarely becomes entirely free. Thus, if a station is contending on this wide band, it might have to freeze its backoff counter for long durations. To avoid this undesirable situation, TFCSMA/CA uses the following additional mechanism (not shown in FIG. 2), which incurs no performance penalty but improves short-term fairness.

Bandwidth Adaptation after Carrier Sensing:

At least some of the stations 3 reduce their bandwidth BW, in this example halve their bandwidth BW with a small probability $\in \ll 1$ after having sensed the wireless transmission medium busy due to a transmission by another station 3. Although this mechanism is simple and requires no additional state, it ensures that each station 3 waits on average no more than $1/\in$ transmissions from other stations 3 before reducing the bandwidth on which it contends. It is useful when there are many stations 3, as it ensures that each station 3 adapts the amount of spectrum on which it contends, without actually experiencing a collision (or waiting for one).

Next a Markov-chain model is introduced to study the spectral self-organization of TF-CSMA/CA. The main purpose of this analysis is to show that a simple frequency-domain scheduling scheme based on random access such as TF-CSMA/CA can exhibit self-organization. From the analysis it can be concluded that if the parameter $\alpha$ is small enough, the stations spend the vast majority of their time in states without interference.

Steady-State Model of Spectrum Consumption

Let $C:=BW_{max}/BW_{min}$ be the number of smallest orthogonal sub-bands. For simplicity of exposition, this analysis is restricted to the case where N=C. For these values, there exists exactly one state without interference. The case N<C corresponds to an easier problem, in terms of finding interference-free assignments, and it can be treated similarly. Note that there does not exist a state without interference when N>C. However, TF-CSMA/CA performs well for all N. First the Markov-chain model is detailed and an example where N=2 and C=2 is provided and then the results are extended to general N. A case is considered where the N stations 3 belong to a single contention domain, and it is assumed that the channel quality is sufficiently high so that packet losses are due to collisions only. Without loss of generality, in this case $BW_{min}=1$ and $BW_{max}=C$. In addition, a modeling assumption is made similar to the decoupling assumption introduced by Bianchi ("Performance analysis of the ieee 802.11 distributed coordination function," IEEE JSAC, 2000) in the time domain, and it is assumed that every station attempts a transmission with a fixed probability p at any given time slot. Let $n_i$, $1 \leq i \leq C$, denote the number of stations 3 using a band which overlaps with the i-th subband of width 1. A discrete-time Markov chain is built whose states represent all the possible patterns according to which the N stations can occupy the spectrum. Precisely, each state belongs to the set $S:=\{n_i: 1 \leq i \leq C, 0 \leq n_i \leq N\}$. S describes the set of all possible states, also if stations could fragment their spectrum. If the stations do not fragment their spectrum (as is the case for TF-CSMA/CA), the possible spectral patterns belong to a subset of S. With TF-CSMA/CA, the stations change their spectral configuration after a transmission attempt with probability $\alpha$ (in case of success) or $\beta_{BW}$ (in case of collision). Therefore, the transitions of the Markov chain from one state to the next occur upon a transmission attempt by any one of the stations 3 (following the assumption of geometric backoff durations).

Figure 3:
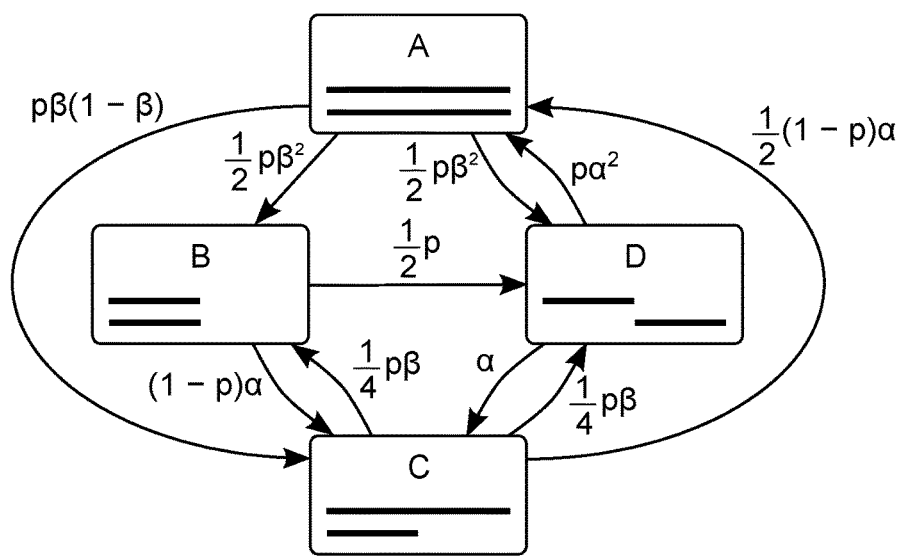
FIG. 3 illustrates a Markov chain for a case of two communication devices and two bandwidths and illustrating possible states of the communication devices.

1) Example with Two Stations and Two Sub-Bands:

It is helpful to first consider the case with two stations 3 and two sub-bands, as the states can be easily enumerated. In this case there are two bandwidths: one bandwidth corresponding to using all the band (i.e. $BW=BW_{max}$) and the other corresponding to half of the band (i.e. $BW=BW_{max}/2$). The Markov chain is represented in FIG. 3. There are four possible states, denoted by A, B, C and D. They correspond to the different combinations of spectrum occupation (the spectrum configurations of the two stations 3 are represented by horizontal lines in FIG. 3 below the state references A, B, C and D).

As there are only two bandwidths, only one $\beta_{BW}$ is needed, as stations can only decrease their bandwidth when $BW=BW_{max}$; hence, here $\beta:=\beta_{BW_{max}}$. The transition probabilities are easy to obtain from the reaction of TF-CSMA/CA to successes and collisions. For example, the transition probabilities from A to B and from A to D are $$\frac{1}{2}p\beta^2,$$

because the other station (the one that does not trigger the state transition) has to transmit (which happens with probability p) and the two stations have to independently choose to reduce their bandwidth (with probability $\beta^2$).

In the case under study, the most desirable state is D because there is no frequency-domain interference and the whole spectrum is used in this state. The following theorem states that, if $\alpha$ is small enough, TF-CSMA/CA spends an arbitrarily large fraction of time in state D.

Theorem 1. Let $\pi_i$ be the stationary distribution of state $i \in \{A, B, C, D\}$. It is obtained:

$$\pi_D \underset{\alpha \downarrow 0}{\to} 1.$$

Proof. Using the balance equation for D, it is obtained $$\pi_D = \pi_D(1 - \alpha - p\alpha^2) + \pi_A \frac{1}{2}p\beta^2 + \pi_B \frac{1}{2}p + \pi_C \frac{1}{2}p\beta.$$

Here it is defined $$\beta' := \min\left\{\frac{1}{4}p\beta, \frac{1}{2}p\beta^2\right\}.$$

It is obtained $$(\alpha + p\alpha^2)\pi_D \geq \sum_{i \in \{A,B,C\}} \pi_i \beta',$$

and thus $$\frac{\pi_D}{\sum_{i \in \{A,B,C\}} \pi_i} \geq \frac{\beta'}{\alpha + p\alpha^2},$$

which concludes the proof.

The result of Theorem 1 also holds if $\alpha=0$, in which case D becomes an absorbing state. However, in this case the chain is no longer ergodic and, for general configurations of N and C, it might remain "stuck" in absorbing states that avoid interference but under-utilize the spectrum. For this reason, TF-CSMA/CA employs a small but non-zero value of $\alpha$ (this point is further elaborated later). Although the proposed Markov model makes simplifying assumptions, it correctly captures the tendency of TF-CSMA/CA to spend the vast majority of the time in the best possible state in this scenario.

2) N Stations and N Sub-Bands:

Theorem 1 is now extended to the general case of N sub-bands (with C=N).

Theorem 2. Let $s^* \in S$ be the (unique) interference-free state (i.e. the most optimal state). It is obtained $$\pi_{s^*} \underset{\alpha \downarrow 0}{\to} 1.$$

Proof. The bandwidth used by a station u in state $s \in S$ is denoted by $BW_u^s$. It is defined $$S_1 := \{s: \max_{u \in \{1, \ldots, N\}} \{BW_u^s\} \leq 2\} \setminus \{s^*\},$$

which is the set of states that are one transition away from $s^*$.

For any two states s and s', let $P_{s \to s'}$ denote the transition probability from s to s'. Now, when the network is in state $s^*$ and a station transmits, there could be a random number, say k, of other stations transmitting at the same time, and k follows a binomial distribution of parameters N−1 and p. Then, the network remains in state $s^*$ if and only if none of the k+1 transmitting stations decides to double its bandwidth.

Therefore, the probability of staying in state $s^*$ is $$P_{s^* \to s^*} = \sum_{k=0}^{N-1} \binom{N-1}{k} p^k (1-p)^{N-1-k}(1-\alpha)^{k+1}$$

$$= (1-\alpha)\sum_{k=0}^{N-1} \binom{N-1}{k}(p(1-\alpha)^k)(1-p)^{N-1-k}$$

$$= (1-\alpha)(p(1-\alpha) + 1 - p)^{N-1}$$

$$= (1-\alpha)(1 - p\alpha)^{N-1}$$

$$\geq (1-\alpha)^N$$

$$\geq 1 - N\alpha.$$

The balance equation for s* can be used to obtain $$\pi_{S^*} \geq \pi_s^*(1-N\alpha) + \Sigma_{s \in S_1} \pi_S P_{S \to S^*}.$$

Let $\beta_{min} := \min_{BW}\{\beta_{BW}\}$. It is easy to see that $$P_{S \to S^*} \geq C^{-N} p^{N-1} (\beta_{min})^N,$$

for any states in $S_1$. It is thus obtained $$\pi_{S^*} \geq \pi_{S^*}(1-N\alpha) + \Sigma_{s \in S_1} \pi_S C^{-N} p^{N-1} (\beta_{min})^N,$$

from which it is obtained $$\frac{\pi_{s^*}}{\Sigma_{s \in S_1} \pi_s} \geq \frac{p^{N-1}(\beta_{min})^N}{C^N N\alpha}$$

and thus, for any state $s \in S_1$, $$\pi_s \leq A(N\alpha)\pi_{s^*}, \quad (1)$$

with $A := C^N/(p^{N-1}(\beta_{min})^N)$.

This reasoning now needs to be iterated over the states that are not in $S_1$ and need more than one transition to reach s*. To this end, the definition of $S_1$ is extended and it is defined $$S_k := \{s : \max_{u \in \{1, \ldots, N\}} \{BW_u^s\} = 2^k\},$$

for $k \geq 2$. Now, for any $k \geq 2$ and any state $S_k \in S_k$, let $\mathcal{N}_{S_k}$ denote the set of stations that use bandwidth $2^k$ in $s_k$. Note that $|\mathcal{N}_{S_k}| > 0$ by construction of $S_k$, and so there exists a state $s_{k-1} \in S_{k-1}$ which is obtained by halving the bandwidth of the stations in $s_k$ which use bandwidth $2^k$ (and having them use any valid center-frequency). It is again easy to see that $$P_{s_k \to s_{k-1}} \geq C^{-N} p^{N-1} \beta_{min}^N$$

and so from the balance equation of $s_{k-1}$, $$\pi_{s_{k-1}} \geq \pi_{s_k} C^{-N} p^{N-1} \beta_{min}^N.$$

This argument can now be iterated k times and combine it with inequality (1) in order to obtain (noting that $k \leq \lceil \log_2(N) \rceil$)

$$\pi_s \leq A^{\lceil \log_2(N) \rceil}(N\alpha)\pi_{s^*}$$

for any possible state $s \in S$, which concludes the proof.

This shows that, by setting $\alpha$ sufficiently small, it can be ensured that TF-CSMA/CA spends an arbitrarily large fraction of the time in the most desirable state. Based on this and other considerations, it is discussed next how to set $\alpha$, as well as the other parameters of the algorithm.

Parameters Configuration

Next, it is studied in more detail how to set the parameters of TF-CSMA/CA, namely $\alpha$, $\beta_{BW}$ and $\in$.

First it is studied how to set $\beta_{BW}$. A collision indicates that a station 3 uses a band which overlaps with another station. In this case, the station 3 should change its center frequency and find a new (hopefully non-overlapping) band and, if it is using a bandwidth, which is too large to find a free spectrum band, it needs to reduce it. The average number of collisions needed to reduce BW is given by $1/\beta_{BW}$: this determines the time which a station 3 has to find an interference-free configuration. Therefore, on the one hand, $\beta_{BW}$ should be sufficiently small so that the stations are given enough time to find an interference-free configuration, if it exists, before reducing their bandwidths. On the other hand, it should not be smaller than needed, as otherwise the stations 3 might lose time looking for an interference-free configuration, which does not exist.

Hence, in order to find an appropriate setting for $\beta_{BW}$, the time is computed which is needed to find an interference-free configuration for a given bandwidth, in situations where the stations 3 should not reduce their bandwidth. This problem is similar to the one addressed in P. Berenbrink, K. Khodamoradi, T. Sauerwald, and A. Stauffer, "Balls-into-bins with nearly optimal load distribution," in ACM SPAA'13, which analyses the time it takes a balls-into-bins algorithm to find a configuration in which all bins have the same number of balls (in the present case, one ball). In the balls-into-bins algorithm, each ball samples randomly each bin until it finds an empty one. This is similar to present algorithm when there are N stations which are using subbands of bandwidth equal to $BW_{max}/N$. In the present case, when a station is in a non-empty sub-band, it detects this through a collision and randomly chooses another sub-band until it finds a free one. According to the analysis of the balls-into-bins algorithm, the time it takes to find such a configuration is O(N).

Based on the above reasoning, $\beta_{BW}$ is set in the following manner: $\beta_{BW} = c \cdot BW$, for some constant c. This is because a station using bandwidth BW is likely to contend with O(1/BW) stations 3, and thus the time needed to find an interference-free configuration will be given by O(1/BW). Hence, in this case $\beta_{BW}$ is set as follows: $\beta_{BW} = O(BW)$. For the choice of c, it is set such that when a station is using $BW_{max}$, then $\beta_{BW_{max}} = 1$ (which is clearly the best configuration for this scenario), which leads to setting $\beta_{BW} = BW/BW_{max}$. It is to be noted that $\beta_{BW}$ is zero if the communications are already using the minimum BW allowed in the communication system.

For setting $\alpha$, based on the above analysis, it is noted that it should be set to a small value, so that the stations experiencing successful transmissions tend to remain on the same band. Setting $\alpha$ to a non-zero value enables the stations to reclaim possibly unused spectrum. $\alpha$ can be for example between 0.0001 and 0.01 and more specifically between 0.0005 and 0.005. It can be for instance about 0.001. It is to be noted that $\alpha$ is zero if the communications are already using the largest BW allowed in the communication system.

$\in$ can be set based on the following reasoning. If it is set $\in = 1/x$, then a station has to wait on average up to x transmissions before halving the bandwidth on which it contends, which means that it might not be able to transmit during this time. Based on this, $\in$ can be between 0.001 and 0.1, or more specifically between 0.005 and 0.05. In one example it is 0.01 so that each station 3 waits on average for no more than 100 transmissions before halving its bandwidth.

Above, a new scheduling algorithm or technique was explained which is a mixture of time and frequency scheduling. Even though TF-CSMA/CA is completely decentralized, its backoff and frequency-repartition mechanism provides significant performance gains compared to time-domain scheduling. TF-CSMA/CA trades off a very high time-domain inefficiency for some frequency-domain inefficiency. By adapting their spectrum bands, the stations pursue two potentially conflicting goals. On the one hand, they aim to avoid using bands that are also used by other stations. On the other hand, they also try to use as much spectrum as possible in order to maximize their transmission rates.

Figure 4:
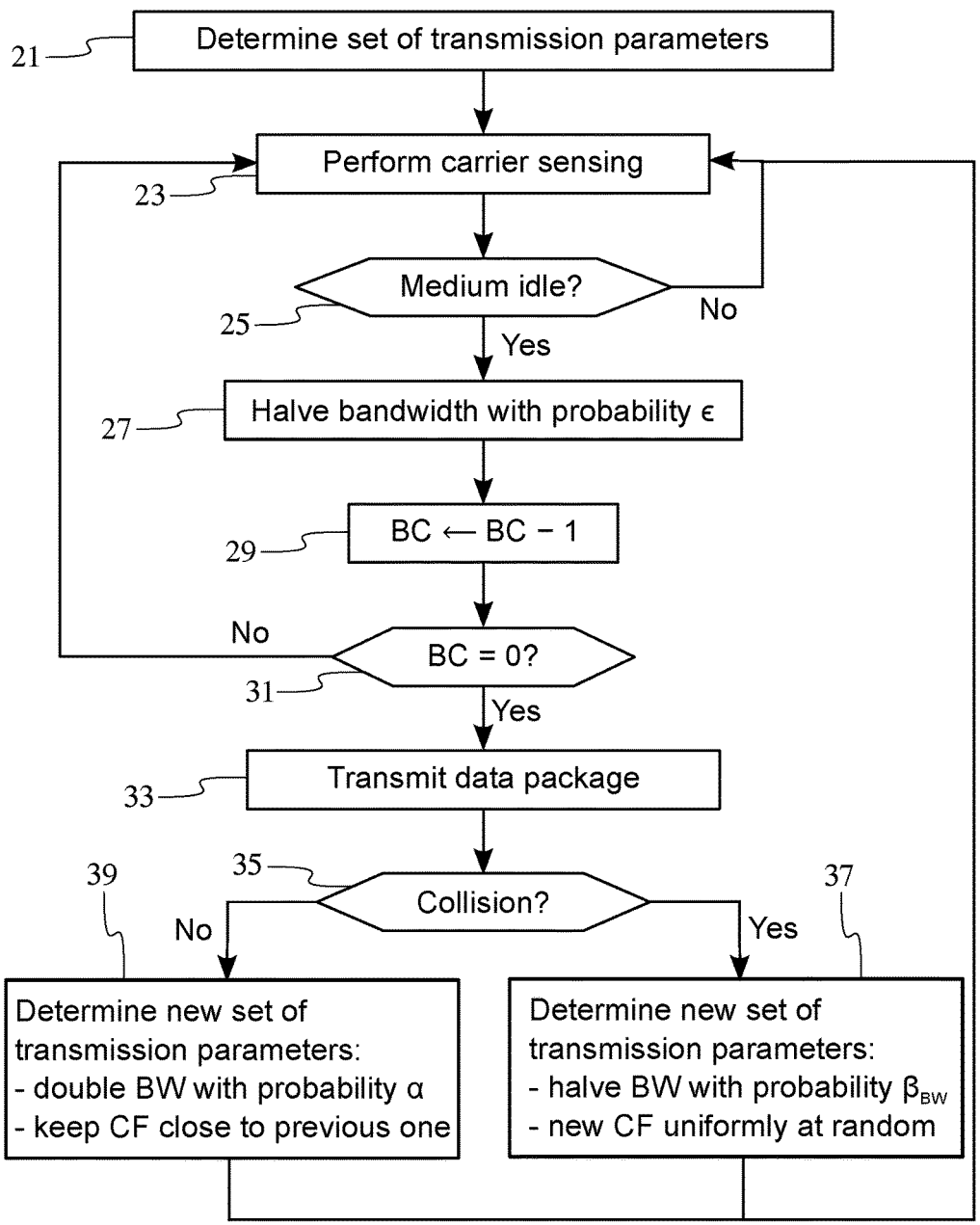
FIG. 4 is a flow chart illustrating a method of transmitting a data packet according to one example of the present invention.

The flow chart of FIG. 4 summarizes the new packet scheduling algorithm according to one example. In step 21 the station 3 determines a first set of transmission parameters. For example, the central transmission frequency can be chose randomly from the available transmission frequencies or this value can be chosen based on previous transmissions (e.g. the same as for the last transmission). Furthermore, a default bandwidth value can be chosen or this value can be chosen based on previous transmissions (e.g. the same as for the last transmission). A smallest contention window length may be chosen, and the backoff counter may then be chosen uniformly at random as explained above.

In step 23, the station 3 performs carrier sensing. In step 25, the station 3 determines whether or not the carrier (transmission medium) is idle. If the carrier is not idle, i.e. it is busy, the process continues in step 23. If on the other hand the carrier is idle, then in step 27 the bandwidth value determined earlier is halved with the probability $\in$. In step 29, the backoff counter of the station 3 is reduced by one. In step 31, the station 3 determines whether or not the backoff counter has reached value zero. If this is not the case, then the process continues in step 23. If on the other hand the backoff counter has reached value zero, then in step 33 the station 3 transmits a first data packet by applying the first set of transmission parameters keeping in mind the outcome of step 27. In step 35 the station 3 determines whether or not a collision occurred. If a collision occurred, then in step a new set of transmission parameters are determined by the station 3 as explained in step 18 of FIG. 2. If on the other hand it was determined that there is no collision, then in step 39 a new set of transmission parameters is determined by the station 3 as explained in step 19 of FIG. 2. The process then continues in step 23.

The proposed scheduling algorithm adjusts both time and frequency access intensities in a random-access fashion. In contrast to existing schemes acting in time and frequency domains, TF-CSMA/CA is completely decentralized and reacts only to collisions, successes and carrier sensing. Overall, relying only on transmission outcomes provides a simple and effective way to assign channels to stations 3 directly at the MAC layer, in a way that departs from the usual "reservation-based" view of spectrum usage, but that is instead determined by instantaneous traffic loads, just like CSMA/CA in the time domain. It was shown that it self-organizes in the spectral domain, efficiently packing the spectrum and avoiding interference. Although it is completely decentralized, it outperforms perfect time-domain scheduling. Furthermore, it provides performance close to what is achievable when a centralized controller directly assigns spectrum to 802.11 nodes in a perfect (but monolithic) fashion.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for a first communication device to transmit a data packet in a wireless communication system, the method comprising:
   determining a first set of transmission parameters comprising a first central transmission frequency and a first spectral bandwidth;
   transmitting a first data packet by applying the first set of transmission parameters;
   determining whether or not the first data packet collided with a second data packet from a second communication device;
   determining a second set of transmission parameters, which in case of collision comprises a second central transmission frequency, and a second spectral bandwidth, which is different from the first spectral bandwidth with a first probability value, and the same as the first spectral bandwidth with a second probability value, the second probability value being equal to 1—the first probability value, the first probability value being non-zero unless the first spectral bandwidth is the minimum spectral bandwidth allowed in the communication system; and
   transmitting a second data packet by applying the second set of transmission parameters.

2. The method according to claim 1, wherein the second central transmission frequency is different from the first central transmission frequency.

3. The method according to claim 1, wherein the second central transmission frequency is randomly selected from a set of available transmission frequencies.

4. The method according to claim 1, wherein the first probability value depends on the first spectral bandwidth.

5. The method according to claim 1, wherein the first probability value is obtained by dividing the first spectral bandwidth with a maximal spectral bandwidth available to any communication device in the wireless communication system.

6. The method according to claim 1, wherein the second spectral bandwidth is selected to be smaller than the first spectral bandwidth with the first probability value.

7. The method according to claim 1, wherein the second spectral bandwidth is substantially half of the first spectral bandwidth.

8. The method according to claim 1, wherein the method further comprises, before transmitting the second data packet:
   sensing a transmission medium to determine whether or not the transmission medium is busy; and
   if the transmission medium is sensed to be busy, then reducing the second spectral bandwidth with a third probability value before sending the second data packet, the third probability value being non-zero unless the second spectral bandwidth is the minimum spectral bandwidth allowed in the communication system.

9. The method according to claim 8, wherein the second spectral bandwidth is reduced by halving it with the third probability.

10. The method according to claim 8, wherein the third probability value is between 0.005 and 0.05.

11. The method according to claim 1, wherein the first and/or second set of transmission parameters also comprise(s) time domain parameters for defining a time domain packet transmission operation of the first communication device.

12. The method according to claim 1, wherein the second set of transmission parameters, in case of no collision, comprises:
   a third spectral bandwidth, which is different from the first spectral bandwidth with a fourth probability value, and the same as the first spectral bandwidth with a fifth probability value, the fifth probability value being equal to 1—the fourth probability value, the fourth probability value being non-zero unless the first spectral bandwidth is the largest spectral bandwidth allowed in the communication system, and a third central transmission frequency, which is different from the first central transmission frequency if the third spectral bandwidth is different from the first spectral bandwidth and the same as the first central transmission frequency if the third spectral bandwidth is the same as the first spectral bandwidth.

13. The method according to claim 12, wherein the third spectral bandwidth is selected to be larger than the first spectral bandwidth with the fourth probability.

14. The method according to claim 12, wherein the third spectral bandwidth is substantially twice the first spectral bandwidth.

15. The method according to claim 12, wherein the third central transmission frequency is selected to be a central transmission frequency adjacent to the first central transmission frequency if the third spectral bandwidth is different from the first spectral bandwidth.

16. The method according to claim 12, wherein the fourth probability is between 0.0005 and 0.005.

17. The method according to claim 1, wherein the first set of transmission parameters also comprises a first contention window value, and wherein the second set of transmission parameters, in case of no collision, comprises a second contention window value smaller than the first contention window value.

18. A communication device for transmitting a data packet in a wireless communication system, the communication device comprising means for:
   determining a first set of transmission parameters comprising a first central transmission frequency and a first spectral bandwidth;
   transmitting a first data packet by applying the first set of transmission parameters;
   determining whether or not the first data packet collided with a second data packet from a second communication device;
   determining a second set of transmission parameters, which in case of collision comprises a second central transmission frequency, and a second spectral bandwidth, which is different from the first spectral bandwidth with a first probability value, and the same as the first spectral bandwidth with a second probability value, the second probability value being equal to 1—the first probability value, the first probability value being non-zero unless the first spectral bandwidth is the minimum spectral bandwidth allowed in the communication system; and
   transmitting a second data packet by applying the second set of transmission parameters.

19. A wireless communication system comprising the communication device according to claim 18, wherein the wireless communication system is a wireless local area network.

* * * * *